March 2, 1971 W. R. BECKETT 3,567,201
FURNACE FOR MELTING SCRAP METAL
Filed Oct. 23, 1968 3 Sheets-Sheet 2
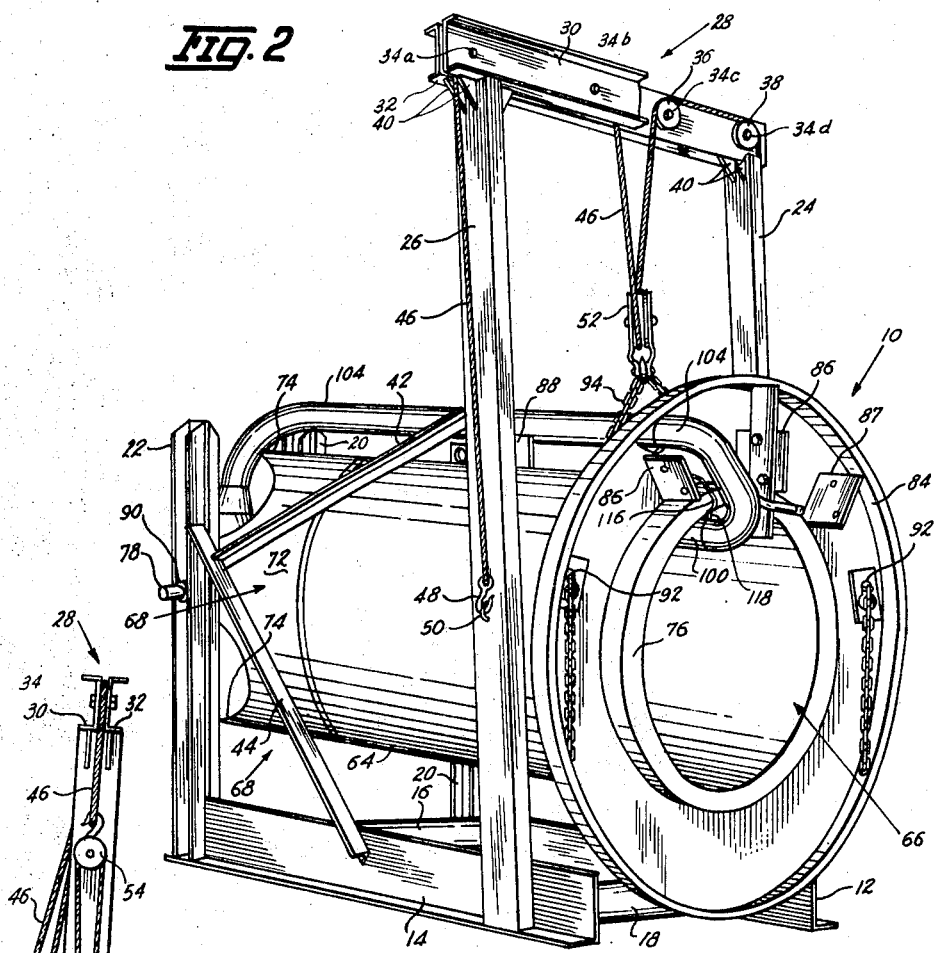
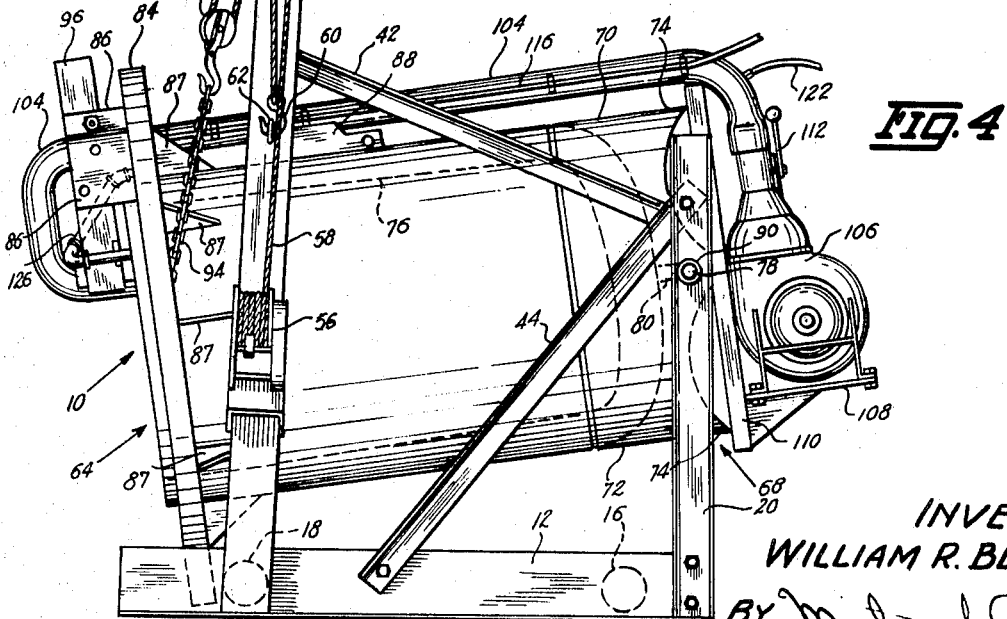
INVENTOR.
WILLIAM R. BECKETT
ATTORNEY.

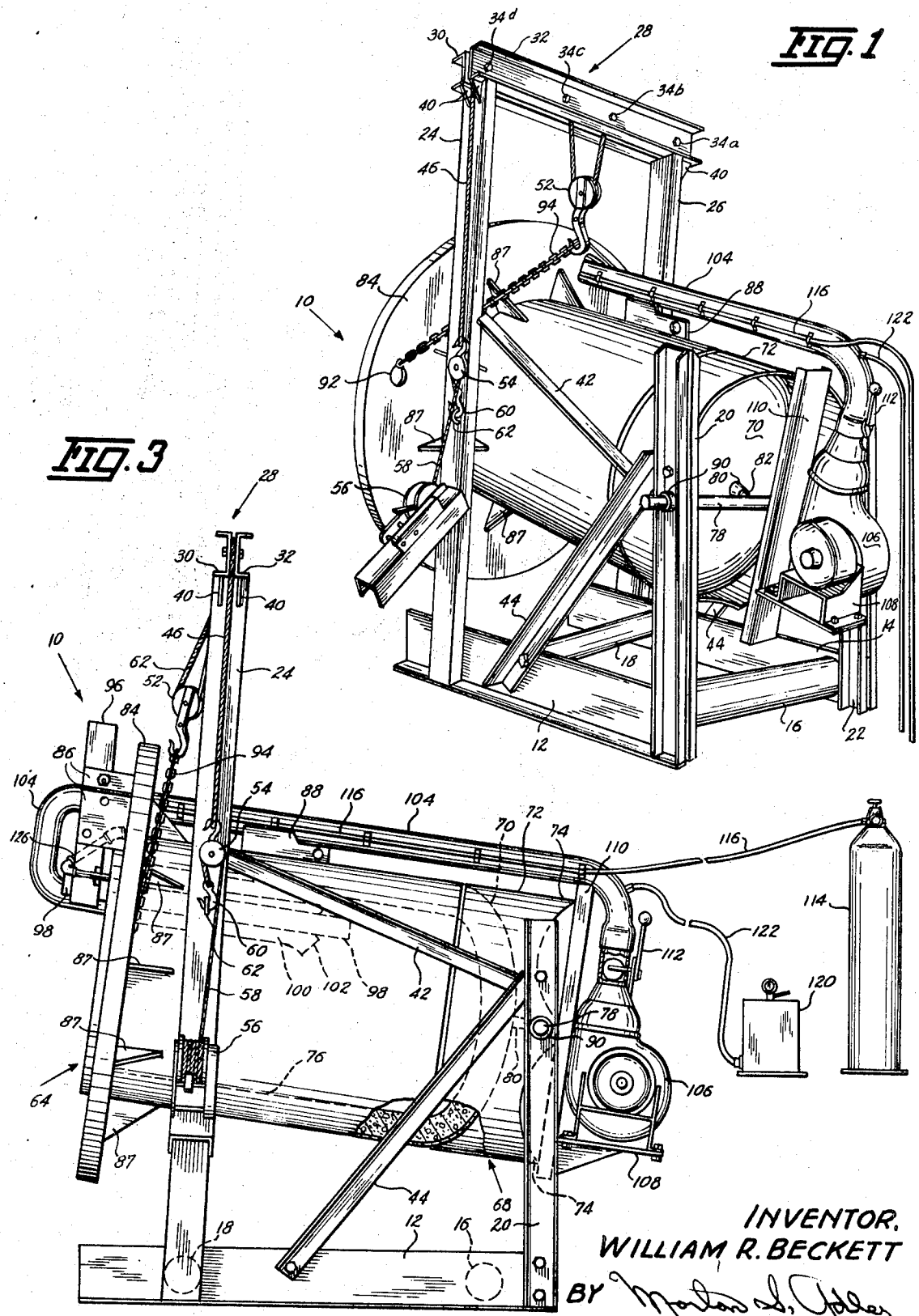

INVENTOR.
WILLIAM R. BECKETT
ATTORNEY.

United States Patent Office 3,567,201
Patented Mar. 2, 1971

3,567,201
FURNACE FOR MELTING SCRAP METAL
William R. Beckett, 409 5th Ave. NE.,
Clarion, Iowa 50525
Filed Oct. 23, 1968, Ser. No. 769,853
Int. Cl. C21b *11/00*
U.S. Cl. 266—33                                   8 Claims

ABSTRACT OF THE DISCLOSURE

A furnace for melting scrap metal which includes a steel barrel lined with a high refractory substance to form a crucible that is directly fired. This furnace is movably mounted relative to a supporting frame wherein the furnace is susceptible of being tilted with the melted material therein so that said material can be poured in its melted state directly out of the crucible into a suitable receptacle or mold. A dampered blower system used with this furnace is utilized to keep the fuel cool until it enters the heating assembly. This furnace is portable intact for use in different locations if desired.

BACKGROUND OF THE INVENTION

(1) Field of the invention

This invention relates to improvements in a furnace for melting scrap metal and more particularly for recovering aluminum and pot metal wherein the furnace is susceptible of being manipulated so that the melted material can be poured directly therefrom.

(2) Description of the prior art

Many types and forms of furnaces for melting scrap metal have previously been used and, in general, they have the common characteristic of being permanently fixed and mounted which requires the melted material to be removed by means of a ladle or the like. The present invention is different from these prior devices in that the furnace is movably mounted relative to a supporting frame so that it may be sufficiently tilted to permit the melted material to be poured into a suitable receptacle or mold and also in the fact that the design of this furnace permits it to be easily transported intact to different desirable locations.

SUMMARY

The present invention utilizes an elongated steel barrel preferably forty-eight inches long, thirty-six inches in diameter with three-eighths inch sidewalls and having a steel cap welded to one end to define a rear or inner end. The inside of the barrel is provided with a one piece liner of a high heat refractory substance to form a crucible that is directly fired. The rear of the barrel is pivotally mounted between supports of a supporting frame so that the forward end of the barrel extends to the opposite end of the frame where it is engaged by a lifting element such as a block and tackle assembly so that such forward end may be selectively raised and lowered and correspondingly raise or lower said front end higher or lower than the elevation of the crucible.

A suitable heating element is supported exteriorly of and on said barrel so as to extend into the barrel and includes preferably two fuel jets for delivering fuel directly to the crucible within the barrel. I have preferably used diesel oil for fuel but other suitable fuels such as gas may be used with satisfactory results. Means are also provided for supplying pure oxygen to the area of the jet discharge and also blower means are provided for discharging atmospheric air into the jet discharge area. Fuel and oxygen lines, the blower and the heating element are all suitably carried by the barrel so that their relative position on the barrel is not changed as the barrel may be raised or lowered and thus the heating element can continue in operation during any tilting of the barrel.

The fuel supply lines are designed to keep the fuel at a cool temperature up to the point of its delivery to the burner assembly and this is accomplished by running the fuel line through the air tube which is connected to the blower.

The supporting frame structure and the barrel are designed so that the entire assembly may be easily lifted intact by a crane and moved to a different location or placed upon a truck or trailer for transporting.

The advantage of the present furnace over current devices is that this furnace materially and substantially reduces the time and labor required to transform aluminum present in scrap metal to an entirely satisfactory and reusable form and this result is obtained by reason of the fact that molten metal can be poured directly from this furnace into a suitable container. Such a procedure eliminates considerable labor and time in removing such material by means of a ladle as is currently the practice. Also, this furnace has the advantage of being easily portable intact without requiring its disassembly and reassembly for operation at different locations.

The objects of this invention together with details of the operation outlined and the advantages of the same will be more fully described and developed in relation to the more detailed description of the accompanying drawings.

BRIEF DESCRIPTION OF THE DRAWINGS

FIG. 1 is a perspective rear view of this new furnace,

FIG. 2 is a perspective front view of this furnace,

FIG. 3 is a side elevational view showing this furnace elevated for purposes of melting scrap metal, FIG. 4 is a side elevational view similar to FIG. 3 but showing this furnace in a lowered position for permitting the melted material to be poured therefrom.

DESCRIPTION OF THE PREFERRED EMBODIMENTS

Figure 5:
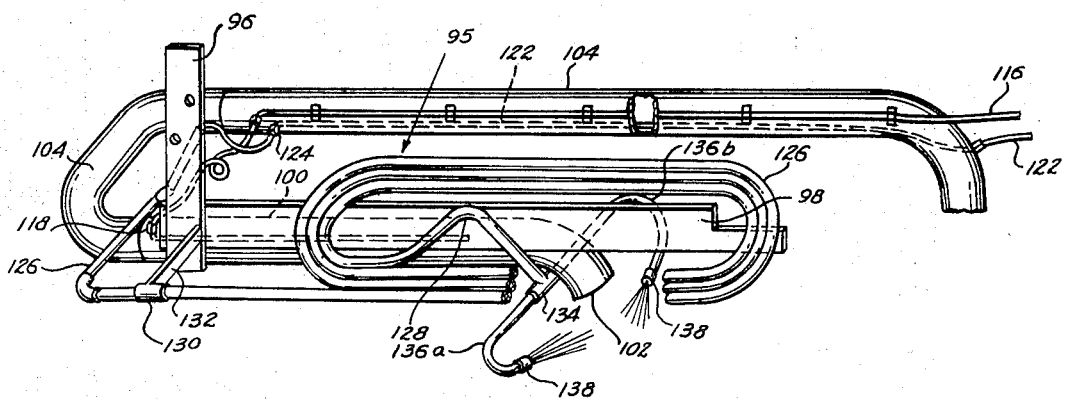
FIG. 5 is an enlarged perspective view of the heating coil and assembly which is disposed within this furnace.

With reference to the drawings, this new furnace is designated generally by the numeral 10 and is designed for what I have referred to as a metal breakage furnace for aluminum and pot metal, the term "metal breakage" in relation to scrap material having reference to any nonferrous metal which in its scrap status is contaminated by other metals, rags, wood, plastic, rubber, porcelain or the like that may be difficult to remove and in which state the aluminum or pot metal is referred to as not being a pure metal.

The purpose of this furnace is to remove the aluminum and pot metal from such scrap items as transmission cases, aluminum heads, blocks and manifolds so that it can be poured into molds in what is known as clean scrap or can be directly poured from this furnace in a substantially pure form directly into a new casting.

Furnace 10 is supported by any suitable frame structure that will permit the use of the furnace as hereinafter described and for this purpose, I have shown a frame comprising the parallel, spaced side rails 12 and 14 which are secured together in longitudinal spaced relationship by the cross members 16 and 18. For rails 12 and 14, I have preferably used a four by eight angle of five-eighths inch steel and for members 16 and 18 I have preferably used a five inch steel pipe although it will be appreciated that any other suitable materials may be used. At the rear end of the rails 12 and 14 defined by the cross member 16, there are the respective upstanding rear posts 20 and 22 which, for purposes of rigidity, I have preferably used two four inch channels back to back. Near the opposite or front end of rails 12 and 14 there is secured the respective upstanding posts 24 and 26 that are substantially higher than the rear posts and, as best seen in FIGS. 3 and 4, are offset slightly from a vertical plane toward the rear posts 20 and 22 for reasons to be later explained. Connecting the top ends of the front posts 24 and 26 is the beam unit 28 for which I have used two like lengths of six inch channel, 30 and 32, secured together back to back in a slightly spaced relationship by means of bolts 34a, b, c and d as seen in FIGS. 1 and 2. Bolts 34a and 34b carry a bushing (not shown) intermediate channels 30 and 32 and bolts 34c and 34d carry the respective pulleys 36 and 38 intermediate the channels 30 and 32. The beam 28 is braced relative to the forward posts 24 and 26 by suitable gussets 40 and both the forward and rear post units are provided with the bracing 42 and 44 as shown.

The forward posts 24 and 26 with the beam 28 carry a lifting means for furnace 10 as will later appear and for this purpose, I have preferably used a block and tackle assembly as follows. A cable 46 with a hook 48 on one end has said hook engaged in an eye 50 on the outer side of post 26 as best seen in FIG. 2. Cable 46 extends from eye 50 between channel members 30 and 32 and over the bushings that are on bolts 34a and 34b where it passes downwardly between said channels and carries the snatchblock 52. Cable 46 then passes upwardly between channels 30 and 32 to be reeved over pulleys 36 and 38 and extends downwardly along the outside of post 26 where it is attached to the smaller snatchblock 54. Lower on post 52, there is mounted a suitable two speed ratchet winch 56 having the cable 58 reeved over the snatchblock 54 and secured to post 24 by the hook 60 and eye 62 as best seen in FIG. 4.

Figure 6:
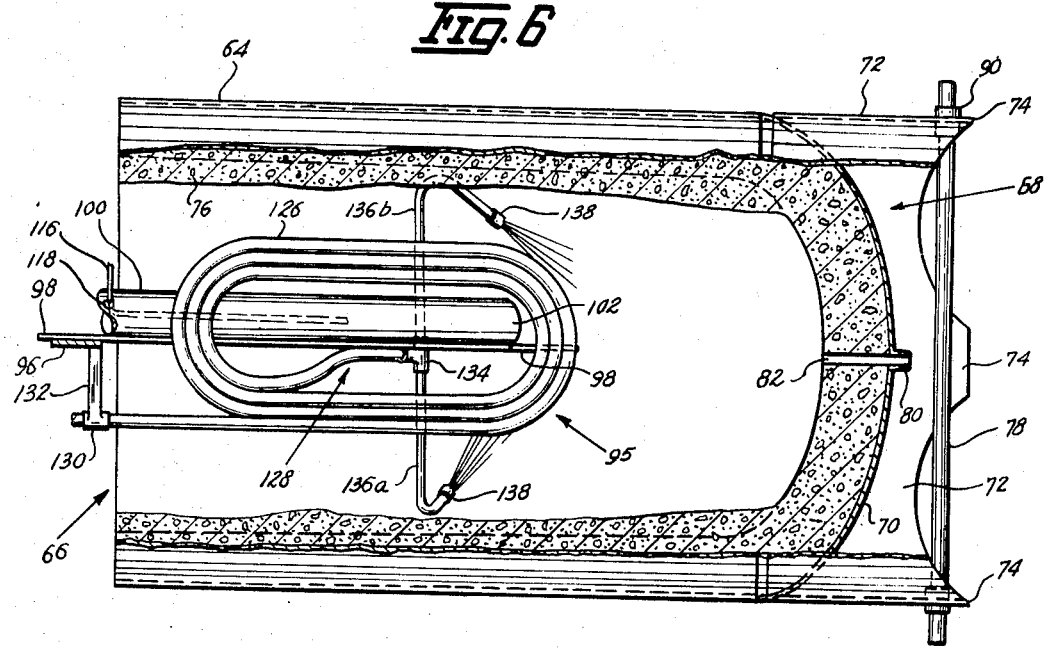
FIG. 6 is a top view of the burner in FIG. 5 showing its relative position to the furnace housing and liner.

With reference now to furnace 10, I have used a steel tank or barrel 64, preferably with three-eighths inch sidewalls and thirty-six inches in diameter which is open at its forward end 66 as seen in FIG. 2 and closed at its rearward end 68 by the bottom member 70. Preferably, the length of barrel 64 is forty-eight inches although the relative dimensions of such barrel may be varied, if desired. Barrel 64 is preferably made from pipe material so that closure 70 is welded thereto and includes the projecting skirt 72 which serves as a base or support when barrel 64 is vertically disposed with its open end up as will be described. Preferably, the outer end of skirt 72 has several concaved cutouts so as to define the feet 74 as best seen in FIG. 6. Thus arranged, there will be in effect four feet equally spaced about the perimeter of the bottom edge of skirt 72.

The interior of barrel 64 is provided with a liner 76 of any suitable commercially available refractory substance to form a crucible which preferably has four inch side walls and a five-inch bottom section. Such liner 76 is formed within the barrel 64 prior to the mounting of the barrel to the frame structure previously described and for this purpose, the barrel 64 is placed upright so as to rest on any suitable surface on feet 74. In this position, a shaft 78 is mounted in two opposite feet members 74 so as to extend diametrically across the bottom 70 and intersect a direct line through a stub pipe 80 which is axially disposed in bottom 70 to provide a passageway to the interior of the barrel.

The liner 76 is cast by means of a suitable mold which is not here material for purposes of this invention but which is referred to generally for purposes of information. Such a mold (not shown) is merely a cylinder closed at one end and having a diameter to form the inner surface of the liner 76 with the inner surface of barrel 64 serving as the complementary outer surface for said mold. The closed end of such mold is provided with an axially extending rod which is designed to pass through the stub pipe 80 to abut the shaft 78 and the length of such rod (not shown) is such as to provide the suitable spacing for the five-inch bottom of the liner 76. The open end of the liner is suitably blocked and by this means a satisfactory liner 76 can be poured so that it results in a smooth surfaced one piece member. The removal of the mold will leave the hole 82 in the bottom of the liner 76 but such hole is of no import and since the mold is removed from only one side of the casting, it will be appreciated that such liner is perfectly fitted to the barrel 64.

The forward end 66 of the barrel 64 is provided with a reinforcing flangelike ring 84 which serves to keep barrel 64 and its liner 76 from getting out of round and also for carrying one or more bracket members 86. The ring 84, on its rearward side, is suitably braced relative to barrel 64 by a plurality of spaced gusset members 87.

Thus far described, barrel 64 is arranged relative to the frame structure previously described as follows. Such barrel may be raised by any suitable hoist means engaging the apertured lifting plate 88 secured to such barrel as seen in FIG. 1 and shaft 78 is pivotally journaled through two opposing feet 74 so that the respective ends of said shaft can be suitably secured in the respective rear posts 20 and 22 as best seen in FIG. 1. For this purpose, bushings 90 will be arranged on shaft 78 as shown.

At the forward end of barrel 64, the flanged surface of ring 84 is provided with suitable keyhole openings 92 to adjustably receive portions of a heavy link chain 94 that extends rather loosely between holes 92 at the rearward side of ring 84. Such loose portion of chain 94 is engaged by the snatchblock 52 so that it will be appreciated barrel 64 is supported within the frame structure shown whereby the longitudinal axis of the barrel 64 is substantially horizontal. In this position, by operation of the winch 56, the forward end of barrel 64 can be selectively raised or lowered whereby the rearward end of the barrel will pivot about shaft 78 and thus the elevation of the forward or open end 66 of barrel 64 can be higher or lower than the elevation of the closed end thereof. In any such movement, the rearward inclination of the front posts 24 and 26 (FIGS. 3 and 4) permit the unobstructed movement of ring 84 which has a substantially larger diameter than that of barrel 64.

A heat generating element or super heater designated generally by the numeral 95 as best seen in FIGS. 5 and 6 is constructed and arranged relative to barrel 64 as follows. An L-shaped support bar having the short vertical arm 96 and the elongated horizontal arm 98 has the short arm 96 suitably secured to one of the brackets 86 so that the long arm 98 extends into the barrel in substantially parallel spaced relationship near the upper wall thereof. In this regard, it is pointed out that there are no securing bolts attached to any portion of the liner 76 and this was designed to eliminate any drilled areas or the like on said liner that would be subject to accelerated deterioration. An air conduit tube, preferably of four inch exhaust stack material, 100 is suitably secured to arm 98 so as to extend into barrel 64 and terminate in the downwardly inclined exhaust end 102. Conduit 100 connects exteriorly of barrel 64 to an air conduit extension 104 which passes through a suitable opening in ring 84 and extends rearwardly over and spaced from the top of barrel 64 to the rear thereof where it connects to a suitable blower unit 106. Unit 106 is mounted on a support bracket 108 that is in turn attached to bar member 110 that is secured to two opposite feet 74 as best seen in FIG. 1. By this arrangement, it will be appreciated that blower 106, the air conduit 100 and air conduit extension 104 will maintain their relative position on barrel 64 as such barrel may be raised or lowered. Blower 106, of course, is provided with a suitable damper means 112.

A suitable source of oxygen supply 114 is provided as seen in FIG. 3 and the oxygen line 116 extends therefrom exteriorly of and clipped to the air extension conduit 104 to a point at the forward end of barrel 64 where such oxygen conduit connects to a suitable fitting 118 on air conduit 100 at a point just outside of the forward end of barrel 64. The oxygen conduit 116 extends into the air conduit 100 and terminates therein within the interior of the barrel but short of the exhaust end 102.

A source of fuel supply, preferably diesel oil, is provided as at 120 in FIG. 3 and the fuel supply line 122 is directed into the air conduit extension 104 closely adjacent the connection of that extension to blower 106. Such fuel line 122 extends through the interior of the air extension conduit 104 to the forward end of barrel 64 where it emerges therefrom through fitting 124 and connects exteriorly of barrel 64 to pipe 126 which is the beginning of the coiled pipe superheating element 95. Pipe 126, as best seen in FIGS. 5 and 6 extends into the interior of barrel 64 where it is provided with a plurality of convolutions disposed over support arm 98 and near its end is bent as at 128 where it is welded to arm 98 to provide the only rigid point of attachment of pipe 126 to such support. Pipe 126 is also freely supported outside of barrel 64 as seen in FIG. 5 by the sleeve 130 on bracket 132 that is secured to arm 96. Just beyond point 128, pipe 126 terminates in a T-fitting 134 from which there are two diverging pipe sections 136a and 136b that terminate in the respective jet nozzles 138. Preferably, T 134 is a welded connection to avoid any leakage and nozzles 138 are preferably made of stainless steeel. Nozzles 138 are so arranged that they direct their discharge on substantially opposite sides and adjacent the exhaust end 102 of the air conduit 100 toward the interior rear portion of the barrel 64 as seen in FIG. 6.

With reference to FIG. 2, it is noted that support arm 96 is secured to only one of several like brackets 86 and the plurality of brackets shown is to provide accommodations for fuel containers such as bottle gas, for example, if the same is desired.

OPERATION

With this furnace constructed and arranged as described, it will be positioned as shown in FIG. 1 to receive metal breakage for purposes of melting and in this position, it will be noted that the forward end 66 of barrel 64 is higher than the rearward end 68. Fuel is delivered through line 122 to the superheated coil unit represented by pipe 126 so as to be discharged from the jets 138 directly into the crucible defined by liner 76. In this regard, such fuel, preferably #2 diesel, is delivered at seventy pounds pressure from a suitable pump at the souce of supply which produces a vaporized discharge at jets 138 and it has been determined that seventy pounds pressure is necessary on the cold fuel passing through the air conduit extension 104 to stabilize the vaporization at jets 138. Air will be delivered through the conduits 104 and 100 by the blower 106 for discharge intermediate the jets 138 as seen in FIG. 5. The oxygen line 116, as described, terminates in its discharge end within pipe 100 as seen in FIG. 5 and with the vaporization from jets 138 ignited, the interior of barrel 64 is adequately heated for the purposes involved. The heat produced by a discharge from jets 138, in addition to heating the interior of barrel 64, acts against the heat coils 126 to keep them heated and thus helps to vaporize the fuel flowing therethrough. It will be appreciated that the source of fuel supply 120 will include a suitable pumping means that may, if desired, be mounted to the support unit 108 on the rear of barrel 64. It is also pointed out that damper 112 is preferably adjusted to cut down the air about one-half under normal operations to reduce the oxidation of the aluminum. Also, it is desired that blower 106 be run immediately when the fuel is ignited and for several minutes after the furnace is shut off as a safety factor in exhausting all fumes. However, because of the arrangement of the heating apparatus in relation to the barrel as described, such heating apparatus can be maintained in operation until the contents of the barrel have been poured out.

Metal breakage such as aluminum pistons, rings, transmission cases, aluminum heads, blocks and the like can be deposited in the crucible within barrel 64 where the heat is preferably maintained in the range of 2000° F.–2350° F. Because of the construction of this furnace with the heat refractory liner 76, it has been determined from actual operation that the temperature on the outer side of this furnace does not exceed 480° F.–500° F. under normal conditions and thus no side shields are necessary. Because of the five inch thickness of the back of the liner, the blower 106 and related equipment at the back of this furnace is not affected in any way by heat.

Since this furnace is designed more particularly to recover aluminum and since aluminum has a melting point in the range of 1300° F.–1400° F., the aluminum in the breakage melts very quickly whereupon the unmelted iron and other debris is manually raked out by any suitable tool so as to leave the clean molten aluminum therein. If desired, flux can be put into the molten aluminum to skim off the dirt and as soon as the undesirable and unmelted material is raked out, the forward end 66 of barrel 64 can be lowered by winch 56 as described whereby the clean aluminum scrap is poured directly out of the crucible into any suitable receptacle or any desired casting.

Field experiments with this furnace have indicated that well over one thousand pounds of scrap an hour can be processed so that this furnace is highly efficient in quickly transforming scrap metal breakage into clean aluminum scrap or clean aluminum castings. As mentioned previously, it is desirable that liner 76 not be scratched or pierced by any bolt holes or the like in order to avoid any cracking in the crucible by the expansion of barrel 64. In this regard, barrel 64 will expand slightly after several hours of operation so that liner 76 is disposed relatively loosely therein.

This furnace can be used anywhere where there is metal breakage to be processed and it can be transported without dismantling the same in any way merely by lifting the entire unit with a suitable hoist engaged with the lifting bar 88. Such furnace may be lifted onto any suitable truck or trailer for transporting and can be put in immediate operation without the necessity for reassembling after such transportation. As a safety precaution when this furnace is transported intact, it is recommended that a securing chain (not shown) be passed over barrel 64 just rearwardly of ring 84 and suitably secured to the respective rails 12 and 14.

It may be necessary on occasion to replace the liner 76 and in such an event the following procedure is recommended. The burner assembly with the air and fuel line should first be removed together with the blower 106 and the mounting bar 110. The rear of the barrel 64 can then be jacked up sufficiently to remove the shaft 78 and barrel 64 can then be removed through the front of the frame in an obvious manner. Once removed, it will be set upright on legs 74 where the old liner can be removed and a new one poured as previously described. Thus, from all of the foregoing, it is thought a full understanding of the construction and operation of this invention will be had and the advantages of the same will be appreciated.

I claim:

1. In a furnace for melting scrap metal, the combination of:
   a receptacle,
   a crucible in said receptacle,
   means for supplying heat directly into said crucible including:
     a bracket exteriorly of said receptacle,
     a support secured to said bracket so as to extend into said crucible,
     a heating element carried by said support,
     said heating element comprising:

a coiled fuel pipe terminating within said crucible in a jet nozzle, and
an air conduit secured to said support and terminating at one end near said jet nozzle,
a blower mounted exteriorly of said receptacle,
an air conduit extension exteriorly of said receptacle suitably connected to said blower and to the other end of said air conduit,
a source of fuel,
a valved fuel line from said source of fuel connected to said coiled pipe,
a source of pure oxygen supply,
a valved oxygen conduit from said oxygen supply having a discharge end within said air conduit,
a frame, and
means movably mounting said receptacle to said frame so that molten metal in said crucible can be removed therefrom by pouring.

2. A furnace as defined in claim 1 wherein:
said receptacle comprises:
an elongated metal housing being closed at one end and open at the other end,
a liner of heat refractory material defining said crucible disposed within said housing,
means pivotally mounting the closed end of said housing to one portion of said frame,
movable support means on another portion of said frame engaged with the open end of said housing so that the longitudinal axis of said housing is normally disposed on substantially a horizontal plane, and
said movable support means being operable to selectively raise and lower said open end of said housing to higher or lower elevations relative to said closed end.

3. A furnace as defined in claim 1 or 2 wherein:
said fuel line extends through the interior of said air conduit extension from a point near said blower and emerges at substantially the opposite end thereof for connection to said fuel pipe at a point exteriorly of said receptacle.

4. A furnace as defined in claim 1 wherein fuel is delivered to said fuel pipe under seventy pounds pressure to stabilize the vaporization of said fuel at said jet nozzle.

5. A furnace as defined in claim 1 or 2 wherein:
said fuel line and oxygen conduit are flexible, and
said bracket and said blower are secured to said receptacle whereby said heating element and blower are maintained in the same relative position on said receptacle irrespective of the plane of elevation of the front end thereof.

6. A furnace as defined in claim 1 or 2 including a lifting plate secured to said housing designed to be engaged by any suitable lifting apparatus whereby said furnace can be moved intact to different selected locations.

7. A furnace as defined in claim 1 wherein:
said fuel line and oxygen conduit are flexible,
said bracket and said blower are secured to said receptacle whereby said heating element and blower are maintained in the same relative position on said receptacle irrespective of the plane of elevation of the front end thereof, and
said heating element by reason of its mounting on said receptacle being capable of effective operation irrespective of the plane of elevation of said receptacle.

8. In a furnace for melting scrap metal, the combination of:
a receptacle,
a crucible in said receptacle,
a bracket exteriorly of said receptacle,
a support secured to said bracket so as to extend into said crucible,
a heating element within said crucible carried by said support,
a source of fuel operatively associated with said heating element,
a frame, and
means movably mounting said receptacle to said frame so that molten metal in said crucible can be removed therefrom by pouring with said heating element being movable with said receptacle and susceptible of being in effective operation during the movement of said receptacle.

References Cited

UNITED STATES PATENTS

| 2,481,699 | 9/1949 | Stroman | 266—33 |
| 2,525,882 | 10/1950 | Ferguson | 266—33 |
| 3,219,322 | 11/1965 | Murer | 266—39 |
| 3,310,298 | 3/1967 | Huwyler et al. | 266—38 |
| 3,350,083 | 10/1967 | Buhrer et al. | 266—38 |
| 3,484,089 | 12/1969 | Foster | 266—33 |
| 2,806,687 | 9/1957 | Graef | 266—36 |

FOREIGN PATENTS

| 896,639 | 5/1962 | Great Britain | 266—34 |

GERALD A. DOST, Primary Examiner

U.S. Cl. X.R.

263—11